Sept. 5, 1939.   R. BUCH ET AL   2,172,186
REMOTE CONTROL OF HEAVY OBJECTS
Filed Dec. 23, 1937

Inventors:
Rudolf Buch,
Friedrich Haemmerling,
by Harry E. Dunham
Their Attorney.

Patented Sept. 5, 1939

2,172,186

UNITED STATES PATENT OFFICE 2,172,186

REMOTE CONTROL OF HEAVY OBJECTS

Rudolf Buch, Berlin-Charlottenburg, and Friedrich Haemmerling, Berlin-Reinickendorf, Germany, assignors to General Electric Company, a corporation of New York Application December 23, 1937, Serial No. 181,424
In Germany February 27, 1936

2 Claims. (Cl. 172—239)

Driving motors, which serve for the adjustment of guns, searchlights, or other heavy objects, must be controlled in exceedingly fine steps over a very extensive speed range. In no case are simple starters and voltage divider arrangements adequate for this purpose. Differences in the speed of 1:100 are obtainable with Ward-Leonard control apparatus, but this ratio is not sufficiently fine for attaining so-called creeping speeds and also attaining the high adjustment speeds required at the same time with change in the target.

By means of the present invention, it is possible to control large motors also with good efficiency and good braking capacity over a wide speed range. According to the present invention, for the remote control of heavy objects through the medium of a Ward-Leonard unit the excitation winding of the Ward-Leonard generator is supplied with current impulses, which are produced through the interruption of a direct current circuit, whereby the building-up of the current impulses is regulable in accordance with the method of control desired. The arrangement can be such that either the durations of the separate current impulses are equal, but their frequency in a given unit of time is regulable, or the frequency of occurrence of the current impulses in the unit of time is substantially constant, but on the other hand their duration is regulable.

Figure 1:
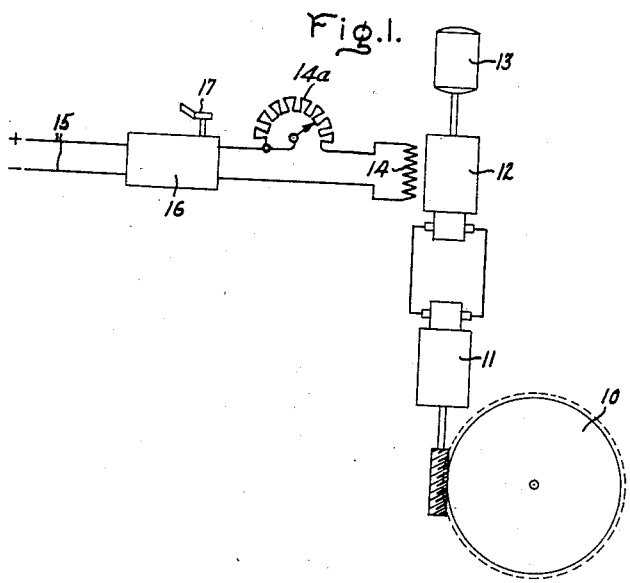
Figure 2:
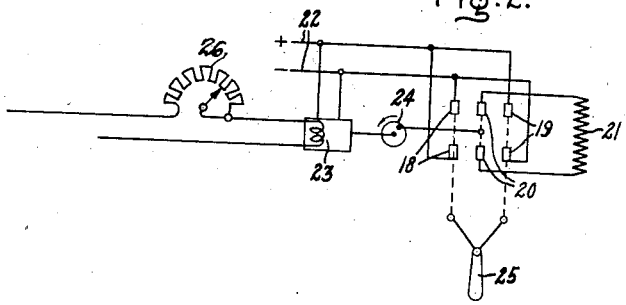

For a better and more complete understanding of the invention, reference should now be had to the following specification and to the accompanying drawing in which Fig. 1 is a simple, diagrammatical representation of an embodiment of the invention, and Fig. 2 is a diagrammatical representation of one form of current impulse transmitter utilized for supplying unidirectional current impulses to the excitation winding of the supply generator.

Referring now to the drawing, a heavy object 10 such, for example, as a searchlight, large gun, or turntable is mechanically connected through the gearing illustrated to the drive shaft of a direct current motor 11. Drive motor 11 is supplied with variable voltage by means of an adjustable voltage generator 12 that is driven at a speed that is preferably substantially constant by any suitable driving means such as the motor 13 which, in turn, is supplied from a suitable source of supply (not shown).

The voltage of supply generator 12 may be adjusted to any desired value by varying its excitation. A suitable rheostat 14a may be provided for this purpose. As shown, the armature of generator 12 is connected in a loop circuit with the armature of motor 11 which operates at a speed dependent upon the impressed voltage. This connection is known as a Ward-Leonard connection.

Supply generator 12 is provided with a direct current excitation winding 14 which is connected to a suitable direct current source represented by the supply lines 15. A suitable current impulse transmitter 16 provided with a control member 17, shown conventionally in Fig. 1, is included in the connections between field winding 14 and supply source 15. Control member 17 serves to control either the frequency of occurrence of the current impulses, or in the case of constant frequency, it serves to control the duration of the impulses. The output side of the impulse transmitter is connected to the excitation winding 12 of the supply generator.

The form of impulse transmitter disclosed in Fig. 2 is a motor driven circuit interrupter. As illustrated, it comprises two pairs of relatively stationary contacts 18 and 19 and arranged in spaced apart relationship, and a pair of movable contacts 20 arranged in the space between the stationary contacts. The movable contacts are electrically connected to the excitation winding 21 which corresponds to the winding 14 of Fig. 1. The two pairs of stationary contacts 18 and 19 are reversely connected to the supply source 22 which corresponds to the source 15 of Fig. 1, i. e., the upper and lower contacts 19 are connected to the positive and negative sides respectively of the supply source and the contacts 18 are respectively connected to the negative and positive sides. Thus the polarity of the generator excitation depends upon which of the two pairs of stationary contacts is engaged by the movable contacts.

The movable contacts 20, which are mechanically connected together, are reciprocated by means of a small pilot motor 23 supplied from source 22 and an eccentric 24 driven by pilot motor 23.

A control member 25 serves to position the movable contacts relative to the stationary contacts so that only one of the pairs of stationary contacts is engaged during each stroke of the movable contacts thereby to control the direction of the current impulses in the excitation winding of the generator.

The frequency of the current impulses depends upon the speed of the pilot motor 23. A variable resistance 26 may be connected in the field circuit of pilot motor 23 for adjusting the speed of the pilot motor to any desired value.

In cases in which a regulator is not employed and the speed of the pilot motor remains unchanged, the stationary contacts may be spring mounted and the distance between movable and stationary contacts varied by means of control member 25 thereby to vary the duration of each current impulse.

The advantage of the present invention resides in the great speed range produced by the impulse control, particularly in the range of the slow speeds. Furthermore, the arrangement has all the properties of Ward-Leonard control, so that, for example, a lagging of the adjusting motor cannot occur.

What we claim as new and desire to secure by Letters Patent of the United States, is:

1. A system for controlling the movement of a heavy object from a remote point comprising in combination, an electric motor mechanically coupled to said object, an adjustable voltage generator electrically connected to supply a voltage to said motor, said generator having a direct current field winding, a direct current source, electrical connections from said source to said winding, a circuit interrupter included in said connections and having two reversely connected pairs of contacts and a third pair of contacts adapted to cooperate with said reversely connected contacts, means for selectively actuating one of said reversely connected pairs of contacts into cooperative relationship with said third pair of contacts, and an electric pilot motor for effecting successive engagements of said third pair of contacts with said pair of selectively actuated contacts thereby to supply a series of unidirectional current impulses of selected polarity to said field winding.

2. A system for controlling the movement of a heavy object from a remote point comprising in combination, an electric motor mechanically coupled to said object, an adjustable voltage generator electrically connected to supply a voltage to said motor, said generator having a direct current field winding, a direct current source, electrical connections from said source to said winding, a circuit interrupter included in said connections comprising two reversely connected pairs of contacts and a third pair of contacts adapted to cooperate with said reversely connected pairs of contacts, means for selectively actuating one of said reversely connected pairs of contacts into position for cooperation with said third pair of contacts, an electric pilot motor for effecting successive engagements of said third pair of contacts with said selectively actuated pair of contacts thereby to supply a series of unidirectional current impulses of selected polarity to said field winding, means for varying the speed of said pilot motor to control the frequency of said impulses, and means for varying the spacing between said contacts.

RUDOLF BUCH.
FRIEDRICH HAEMMERLING.